(12) United States Patent
Falat et al.

(10) Patent No.: US 6,639,004 B2
(45) Date of Patent: Oct. 28, 2003

(54) METHOD FOR MAKING ODOR SORBING PACKAGING MATERIAL

(75) Inventors: Ladislav Falat, Columbia, MD (US); James R. Miller, Roanoke, VA (US); Mark E. Schiek, Mt. Airy, MD (US); David R. Walker, Charleston, SC (US)

(73) Assignee: Mead Westvaco Corporation, Stamford, CT (US)

( * ) Notice: Subject to any disclaimer, the term of this patent is extended or adjusted under 35 U.S.C. 154(b) by 162 days.

(21) Appl. No.: 09/904,804

(22) Filed: Jul. 12, 2001

(65) Prior Publication Data

US 2002/0141961 A1 Oct. 3, 2002

Related U.S. Application Data

(62) Division of application No. 09/388,071, filed on Sep. 1, 1999, now abandoned.

(51) Int. Cl.[7] .................................................. B01J 20/20

(52) U.S. Cl. ........................................ 524/495; 502/402

(58) Field of Search .......................... 502/416, 527.12, 502/402; 524/495; 604/367

(56) References Cited

U.S. PATENT DOCUMENTS

| | | | | |
|---|---|---|---|---|
| 2,593,146 | A | 4/1952 | Howard | 154/50 |
| 3,149,023 | A | 9/1964 | Bodendorf et al. | 162/135 |
| 4,504,290 | A | 3/1985 | Pontius | 55/316 |
| 4,517,308 | A | 5/1985 | Ehlenz et al. | 502/401 |
| 4,748,065 | A * | 5/1988 | Tanikella | 428/152 |
| 5,022,553 | A | 6/1991 | Pontius | 220/410 |
| 5,540,916 | A | 7/1996 | Parks | 427/7.61 |
| 5,693,385 | A | 12/1997 | Parks | 428/34.2 |
| 5,860,391 | A | 1/1999 | Maxwell | 119/173 |
| 6,395,522 | B1 * | 5/2002 | DeFilippi et al. | 435/180 |

FOREIGN PATENT DOCUMENTS

| | | |
|---|---|---|
| EP | 0587293 | 3/1994 |
| EP | 1081181 | 8/2000 |
| JP | 59-017353 | 1/1984 |
| JP | 05-069516 | 3/1993 |

* cited by examiner

*Primary Examiner*—Stuart L. Hendrickson

(57) ABSTRACT

An odor sorbing packaging material is prepared by applying to at least one surface of a flexible substrate an odor absorbing coating containing an effective concentration of activated carbon. The packaging material may be converted into packages, bags, pouches, liner members, wrappers or the like for packaging products and other materials that generate objectionable odors.

5 Claims, No Drawings

METHOD FOR MAKING ODOR SORBING PACKAGING MATERIAL

This is a divisional of abandoned application Ser. No. 09/388,071 filed Sep. 1, 1999.

BACKGROUND OF INVENTION

The present invention relates generally to a novel odor sorbing packaging material and more particularly to a method for preparing such a material that can be converted into packages for products which generate objectionable odors.

One of the most widely accepted materials used to absorb odors is activated carbon. Activated carbon is used in paperboard packaging, filters, gas masks and other devices to absorb and trap objectionable odors, aromas and other impurities. For example U.S. Pat. Nos. 5,540,916 and 5,693,385, owned by the present assignee herein, disclose an odor sorbing packaging material comprising paperboard onto which there is applied a coating comprising activated carbon. Other prior art which discloses paper-based packaging containing activated carbon includes U.S. Pat. No. 2,593,146 which discloses laminated sheets for wrapping foodstuffs, and U.S. Pat. No. 3,149,023 which discloses treated paperboard for packaging. U.S. Pat. No. 4,504,290 discloses a filter element which contains activated carbon for odor control; U.S. Pat. No. 4,517,308 discloses the use of activated carbon in filter mats, air fresheners, inner soles for shoes etc.; U.S. Pat. No. 5,022,553 discloses a diaper storage container having a substantially rigid inner liner containing activated carbon; and, U.S. Pat. No. 5,860,391 discloses the use of activated carbon in animal litter. However, as will be noted, in each of the prior art teachings, the activated carbon applications have been made primarily to rigid or semi-rigid products. Accordingly, it is an object of the present invention to incorporate activated carbon into a non-rigid structure in an expeditious, economical and effective manner.

SUMMARY OF INVENTION

The present invention relates generally to packaging materials and more specifically to a substantially flexible packaging material that has been treated to absorb the odors and aromas given off by products contained within packages constructed from the packaging material. For this purpose, the present invention employs activated carbon, a material well known for its ability to absorb objectionable odors. In a preferred embodiment, the activated carbon is applied to one or both surfaces of a flexible, polymeric film material using conventional technology. However it is contemplated that other flexible substrates such as paper onto which there is applied a polymer coating, or laminates of paper and polymer films could be used.

Activated carbon materials such as the NUCHAR products sold by Westvaco Corporation (the assignee herein), are available in particle sizes, or can be ground to particle sizes, which are readily dispersable in coatings, inks or the like suitable for application to flexible film materials such as polyolefins. After application of the activated carbon to the film materials, the treated film can be converted into packages, liner elements, trash bags, pouches, wrappers or the like suitable for use in many different applications where odor absorption is desired.

It is therefore, an object of the present invention to provide an improved method for applying an odor sorbing coating to packaging material.

It is another object of the invention to provide an odor sorbing packaging material with a sufficient concentration of activated carbon to accomplish the purpose of deodorizing substantially the entirety of packages converted from the packaging material.

And, finally, it is an object of the invention to provide an substantially flexible odor sorbing packaging material that may be converted into various packages useful for a variety of purposes which require odor control.

To satisfy these and other objects of the present invention contemplates the use of activated carbon dispersed in a binder that can be applied to a polymeric film. Sub-micron carbon black is known for use as a coloring pigment in the manufacture of polyethylene resins to produce black trash bags. However, attempts to use typical odor sorbing activated carbons of larger particle size (5–40 microns) have been unsuccessful because the presence of the particles have produced films with holes (voids) at higher carbon concentrations, or low odor sorbing capacity at low carbon concentration. Likewise, attempts to apply an aqueous coating containing activated carbon to a polyolefin film have been less than successful. Such attempts have produced, on the one hand, coatings with a low carbon content (less than about 60%), that adhered well, but performed poorly in odor tests, or coatings with a carbon content greater than about 80%, with good odor sorption characteristics, but poor adhesion and excessive carbon rub-off. To overcome these problems, the present invention was developed. The present invention solves the problems referred to hereinbefore by applying the activated carbon containing coating in two steps.

DETAILED DESCRIPTION

The present invention is directed to the use of activated carbon in the manufacture of an odor absorbing packaging material. In the preferred embodiment, the packaging material comprises a substantially flexible polymer substrate onto which there is applied a coating containing activated carbon.

In one form of the present invention the substrate comprises a low density polyethylene (LDPE) film upon which activated carbon in an aqueous coating composition containing a suitable binder that adheres well to LDPE is applied by conventional techniques such as coating, printing or the like. While LDPE is disclosed herein as a preferred substrate, other polymer films could readily be substituted with a suitable binder material. Examples of such polymer films are poly-propylene, polyester, and polyamide.

An example of a suitable binder material for the preferred LDPE substrate is an aqueous styrene acrylate emulsion (identified as JONREZ E-2064 from Westvaco Corporation's Chemical Division), that wets out the LDPE film to provide acceptable adhesion. "Wets out" in this context means that the emulsion spreads easily on the film surface without beading up. An aqueous binder system is preferred for the present invention as opposed to a solvent based system for environmental reasons and because solvent recovery systems are complex and costly.

Initial coatings with up to 50% by weight of activated carbon having a particle size of about 5 microns adhered easily to LDPE film without appreciable rub off, but performed poorly in odor absorption tests. With 60% or more by weight activated carbon applied, significant rub off occurred and the products were deemed unacceptable. In order to increase the concentration of carbon on the surface and reduce rub off, a two step process for applying the coatings was adopted.

The two step procedure involves an initial application of a primer coating that may contain from about 0–50% by weight activated carbon, followed by a second coating application comprising a carbon/binder mixture of up to about 95% by weight activated carbon and the remainder binder. The second application comprising up to 95% carbon adheres well to the first primer layer with no appreciable rub off and achieves a high concentration of activated carbon on the film surface to achieve good odor control.

Odor panel testing of samples prepared according to the invention demonstrated the effectiveness of the two step process. The results of the tests are shown in Table I.

TABLE I

Odor Panel Testing

| Carbon Sample | 1 hour | 24 hours |
|---|---|---|
| Odor (onion) | 5 | 5 |
| 100% Binder | 3.5 | 3.5 |
| Carbon Powder | 3.5 | 2 |
| 50% Carbon/50% Binder | 2 | 1 |
| 1st Step: 100% Binder 2nd Step: 95% Carbon/5% Binder | 1 | 1 |

Odor Rating: (no odor) 1 . . . 5 (strong odor) One drop of onion juice per jar. LDPE substrate.

The test samples contained equivalent amounts of activated carbon. For example, almost twice the surface area of the 50/50 carbon/binder coating was used compared with the 95/5 sample prepared with two steps. The results indicate that the 50/50 coating was substantially as effective at negating the onion odor after 24 hours as the 95/5 sample, however the latter coating with a greater concentration of activated carbon at the film surface was more effective after 1 hour.

Accordingly it will be seen that the novelty of the present invention lies in the technique for applying the greatest concentration of carbon available at the film surface with little or no rub off. The amount of carbon necessary to accomplish the desired odor abatement result will depend in the first instance upon the strength of the odor desired to be eliminated or absorbed. For the purposes of the present invention, an effective application of activated carbon is intended to mean sufficient carbon to absorb substantially all of the odor present in the packaged product or waste. Since the total amount of carbon required for any specific application cannot be defined with any specificity, a trial and error process may be involved.

While only a preferred embodiment of the present invention has been fully described, it will be obvious to those skilled in the art that various modifications and substitutions could be made in the invention without departing from the scope of the invention as defined in the appended claims.

What is claimed is:

1. A material comprising:

a flexible polymeric film with a first coating comprising an aqueous binder with less than 50% activated carbon by total weight of the first coating applied to at least one side of said polymeric film and a second coating comprising an aqueous binder with about 80% to about 95% activated carbon by total weight of the second coating applied to said first coating.

2. The material of claim 1 wherein the polymeric film is selected from the group consisting of polyolefins, polyesters, low density polyethylene and polyamides.

3. The material of claim 1 wherein the first coating has less than 5% activated carbon by weight of the first coating.

4. The material of claim 1 wherein the material is formed into a container.

5. The material of claim 1 wherein the activated carbon has a particle size of about 5 microns.

\* \* \* \* \*